United States Patent
Kitajima

(10) Patent No.: US 10,977,777 B2
(45) Date of Patent: Apr. 13, 2021

(54) IMAGE PROCESSING APPARATUS, METHOD FOR CONTROLLING THE SAME, AND RECORDING MEDIUM

(71) Applicant: CANON KABUSHIKI KAISHA, Tokyo (JP)

(72) Inventor: Kotaro Kitajima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/363,773

(22) Filed: Mar. 25, 2019

(65) Prior Publication Data
US 2019/0304071 A1 Oct. 3, 2019

(30) Foreign Application Priority Data
Mar. 30, 2018 (JP) .............................. JP2018-069289

(51) Int. Cl.
| | | |
|---|---|---|
| G06T 15/60 | (2006.01) | |
| G06T 5/00 | (2006.01) | |
| H04N 13/271 | (2018.01) | |
| G06T 5/50 | (2006.01) | |
| G06T 7/593 | (2017.01) | |
| H04N 13/00 | (2018.01) | |

(52) U.S. Cl.
CPC ............... G06T 5/008 (2013.01); G06T 5/50 (2013.01); G06T 7/593 (2017.01); H04N 13/271 (2018.05); *G06T 2207/10012* (2013.01); *G06T 2207/30201* (2013.01); *H04N 2013/0081* (2013.01)

(58) Field of Classification Search
CPC ......... G06T 15/50; G06T 15/80; G06T 15/60; G06T 15/06
USPC ........................................................ 345/426
See application file for complete search history.

(56) References Cited

U.S. PATENT DOCUMENTS

| | | | |
|---|---|---|---|
| 2012/0050561 A1* | 3/2012 | Kitajima ............ | H04N 1/00453 348/222.1 |
| 2012/0082368 A1 | 4/2012 | Hirai | |
| 2014/0132389 A1* | 5/2014 | Choi .................... | G06K 7/1443 340/5.1 |
| 2014/0205182 A1* | 7/2014 | Ono ...................... | H04N 13/106 382/154 |

(Continued)

FOREIGN PATENT DOCUMENTS

| | | |
|---|---|---|
| CN | 104954697 A | 9/2015 |
| CN | 106256122 A | 12/2016 |

(Continued)

*Primary Examiner* — Gordon G Liu
(74) *Attorney, Agent, or Firm* — Canon U.S.A., Inc. IP Division

(57) ABSTRACT

An image processing apparatus includes a plurality of acquisition units configured to acquire distance distribution information about a subject included in the image, the plurality of acquisition units including a first acquisition unit configured to acquire the distance distribution information about the subject included in the image, based on parallax information about the image, and a second acquisition unit configured to acquire the distance distribution information about the subject included in the image, based on a feature quantity of the image different from the parallax information, and a determination unit configured to determine the acquisition unit which has acquired the distance distribution information with which a relighting process is to be performed, among the plurality of acquisition units.

9 Claims, 7 Drawing Sheets

(56) References Cited

U.S. PATENT DOCUMENTS

2015/0312553 A1* 10/2015 Ng .................... H04N 5/23203
                                                              348/47
2017/0124689 A1* 5/2017 Doba .................... G03B 15/02
2017/0206704 A1 7/2017 Inoue

FOREIGN PATENT DOCUMENTS

| JP | 2012-78942 A | 4/2012 |
| JP | 2013080544 X | 4/2015 |

* cited by examiner

FIG.6A
ENTIRE LIGHTING MODE
FIG.6B
SMALL FACE LIGHTING MODE
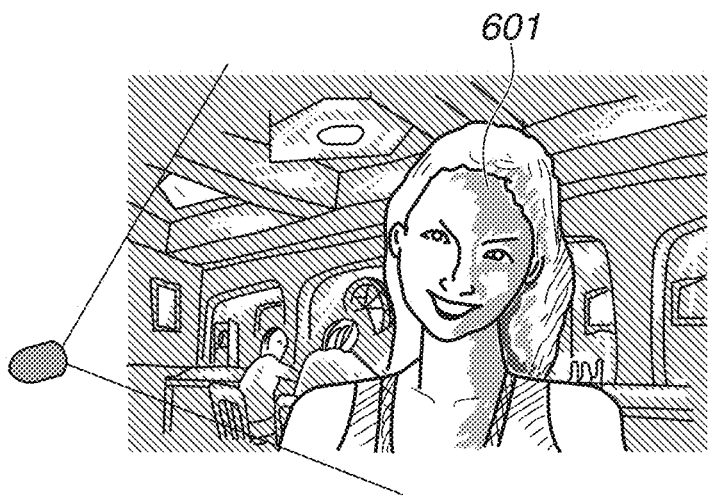
FIG.6C
CATCH LIGHT MODE
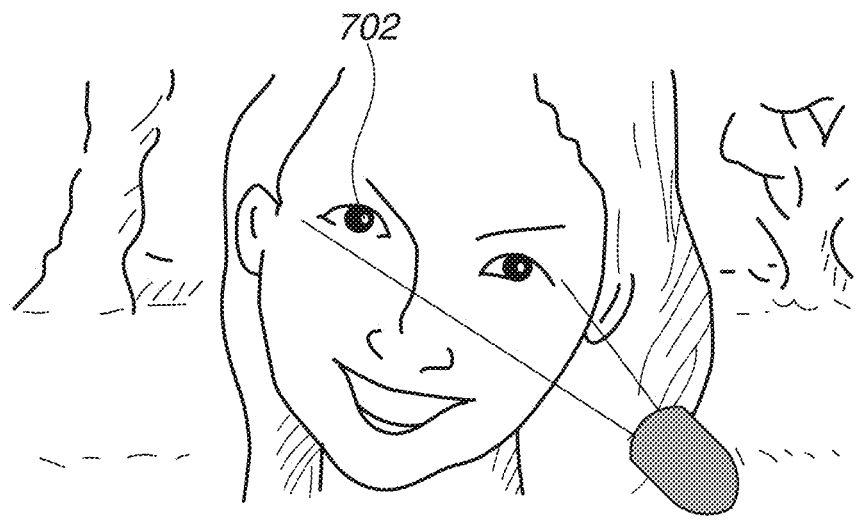

and recording medium

BACKGROUND

Field of the Disclosure

The present disclosure relates to an image processing apparatus, and more particularly to an image processing apparatus for correcting the brightness of an input image.

Description of the Related Art

In conventional photographing, adjustment of light and shade areas on a subject is performed through light adjustment by using auxiliary lighting or a reflex board. This makes it possible to perform photographing by changing the impression of the subject in various ways. As a technique for performing the above-described light adjustment after image capturing, a certain method applies light and shade to a subject image by using a virtual light source based on subject shape information.

This technique enables making the image pictorial and impressive. Further, highlighting and shading the image enables emphasizing a stereoscopic effect on the image. Examples of methods for acquiring subject shape information include a method for using a ranging sensor and a method for generating data of a distance map based on parallax information about a plurality of images. Such a distance map may contain errors due to various factors. To solve this problem, there has been proposed a technique for correcting distance information for each pixel of a distance map.

For example, Japanese Patent Application Laid-Open No. 2012-78942 discusses a technique for performing clustering by using pixel values and distance values of a plurality of pixels in the calculation range of a correction target pixel, and, based on the clustering result, calculating the distance value of the correction target pixel. Distance information for each pixel is corrected in this way.

However, what kind of subject information, such as a distance map, is most suitable depends on image processing to be performed, for example, the type of a virtual light source to be used to add an effect to a subject.

SUMMARY

An image processing apparatus includes a plurality of acquisition units configured to acquire distance distribution information about a subject included in the image, the plurality of acquisition units including a first acquisition unit configured to acquire the distance distribution information about the subject included in the image, based on parallax information about the image, and a second acquisition unit configured to acquire the distance distribution information about the subject included in the image, based on a feature quantity of the image different from the parallax information, and a determination unit configured to determine an acquisition unit which has acquired the distance distribution information with which the relighting process is to be performed, among the plurality of acquisition units.

Further features of various embodiments will become apparent from the following description of exemplary embodiments with reference to the attached drawings.

BRIEF DESCRIPTION OF THE DRAWINGS

FIGS. 6A, 6B, and 6C illustrate relighting modes according to some embodiments.

DESCRIPTION OF THE EMBODIMENTS

An exemplary embodiment will be described in detail below with reference to the accompanying drawings. The present exemplary embodiment will be described below based on an example where a digital camera is applied as an image processing apparatus.

The digital camera according to the first exemplary embodiment will be described below with reference to the accompanying drawings.

Figure 1:
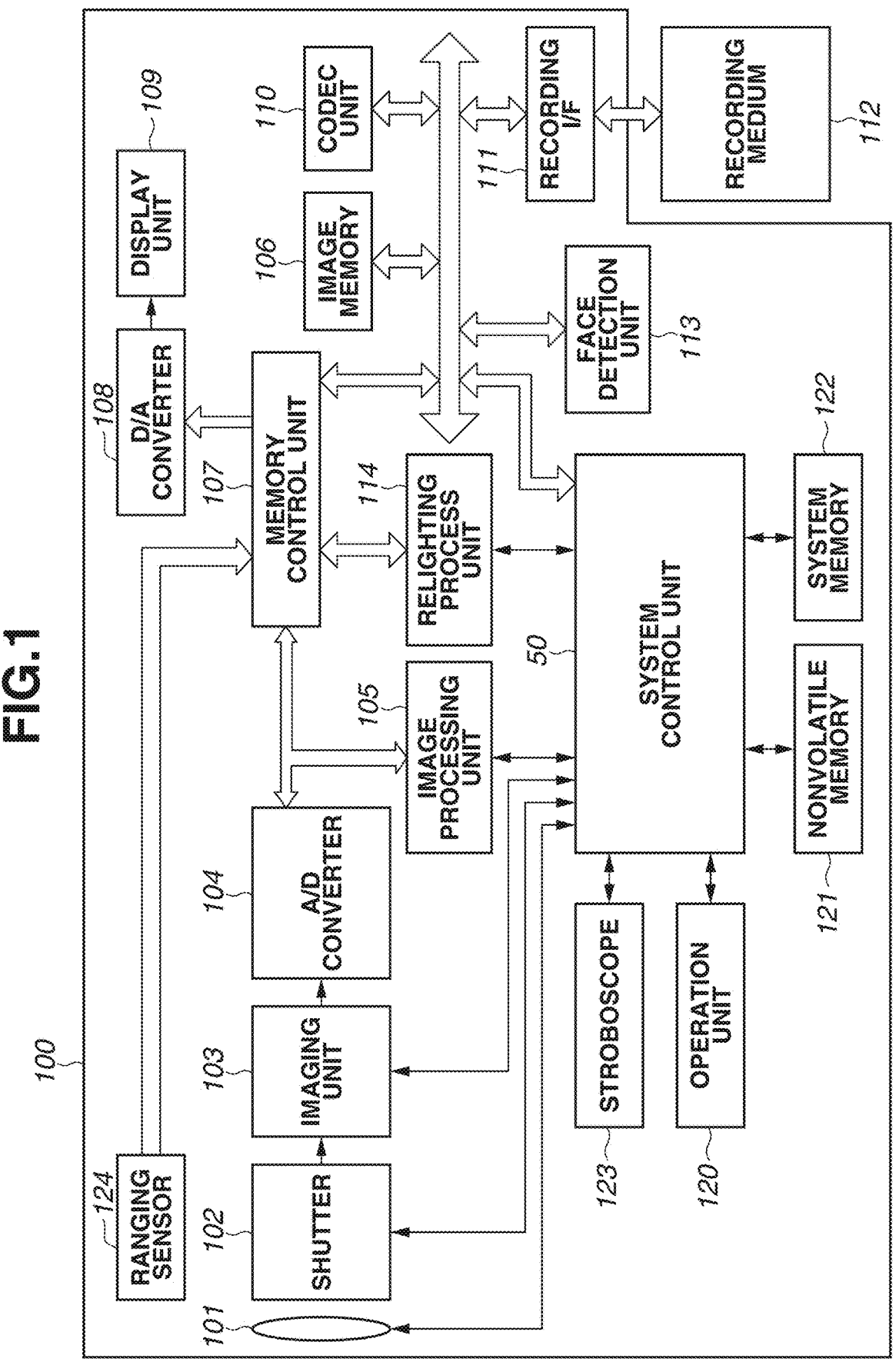
FIG. 1 is a block diagram illustrating a configuration of a digital camera according to some embodiments.

FIG. 1 is a block diagram illustrating an example of a configuration of a digital camera according to an exemplary embodiment.

FIG. 1 illustrates an overall configuration of a digital camera 100. The digital camera 100 includes a lens group 101 including a zoom lens and a focal lens, a shutter 102 having a diaphragm function, and an imaging unit 103 including a charge coupled device (CCD) or complementary metal-oxide semiconductor (CMOS) sensor for converting an optical image into an electrical signal. The digital camera 100 further includes an analog-to-digital (A/D) converter 104 for converting an analog signal into a digital signal, and an image processing unit 105 for performing various image processing, such as white balance processing, gamma processing, edge emphasis processing, and color correction processing, on image data output from the A/D converter 104. The digital camera 100 further includes an image memory 106, a memory control unit 107 for controlling the image memory 106, a digital-to-analog (D/A) converter 108 for converting an input digital signal into an analog signal, a display unit 109, such as a liquid crystal display (LCD), and a codec unit 110 for performing compression-coding/decoding on image data. The digital camera 100 further includes a recording interface (I/F) 111 with a recording medium 112, such as a memory card and a hard disk, and a face detection unit 113 for detecting a face area in a captured image. The digital camera 100 further includes a relighting process unit 114 for performing relighting process on a captured image, and a system control unit 50 for controlling the entire system of the digital camera 100. The digital camera 100 further includes a nonvolatile memory 121, such as an electrically erasable programmable read only memory (EEPROM), for storing programs and parameters, and a system memory 122 for loading constants and variables for operations of the system control unit 50 and programs read from the nonvolatile memory 121. The digital camera 100 further includes a physical light source apparatus 123, such as a stroboscope, and a ranging sensor 124 for measuring the distance between the subject and the digital camera 100 and outputting distance information about captured pixels as a two-dimensional distance map image. The ranging sensor 124 according to the present exemplary embodiment performs ranging by using what is called the parallax image. The ranging sensor 124 may be an independent sensor, or the imaging unit 103 (for example, the imaging plane of a CMOS sensor) may also serve as the ranging sensor 124. For example, in a configuration of the imaging unit 103 for acquiring the parallax image for each pixel, the subject distance can be acquired for each pixel, making it possible to generate a pixel-unit distance map image.

The configuration of the digital camera 100 is not limited to the configuration illustrated in FIG. 1. For example, a single hardware component may function as a plurality of processing units and a control unit according to a program to be executed. Also, a plurality of hardware components may collaborate to function as a processing unit or a control unit. Various types of processing may be performed according to a program, or a circuit for performing various processing may be provided.

This completes the description of the configuration of the digital camera 100. Basic operations for capturing a subject performed by the digital camera 100 configured as described above will be described below. The imaging unit 103 performs photoelectric conversion on light incident through the lens 101 and the shutter 102 and outputs an electrical signal to the A/D converter 104 as an input image signal. The A/D converter 104 converts the analog image signal output from the imaging unit 103 into a digital image signal and outputs the digital image signal to the image processing unit 105.

The image processing unit 105 performs color conversion processing, such as white balance processing, gamma processing, and edge emphasis processing, on image data from the A/D converter 104 or image data from the memory control unit 107. The image processing unit 105 performs predetermined evaluation value calculation processing based on the face detection result of the face detection unit 113 or captured image data. The system control unit 50 performs exposure control and ranging control based on the obtained evaluation value result. Accordingly, the image processing unit 105 performs autofocus (AF) processing, automatic exposure (AE) processing, and automatic white balance (AWB) processing based on the through-the-lens (TTL) method.

Image data output from the image processing unit 105 is written in the image memory 106 via the memory control unit 107. The image memory 106 stores image data output from the imaging unit 103, and the image memory 106 stores image data to be displayed on the display unit 109.

The D/A converter 108 converts the data for image display stored in the image memory 106 into an analog signal and supplies the analog image data to the display unit 109. The display unit 109 displays the image data on the display unit, such as an LCD, according to the analog signal received from the D/A converter 108.

The codec unit 110 performs compression coding on the image data recorded in the image memory 106 based on the Joint Photographic Experts Group (JPEG) and Moving Picture Experts Group (MPEG) standards. The system control unit 50 associates the coded image data and stores the coded image data in a recording medium via a recording I/F 111.

This completes the description of basic operations when capturing a subject.

In addition to the above-described basic operations, the system control unit 50 executes programs recorded in the above-described nonvolatile memory 121 to implement various processing according to the present exemplary embodiment (described below). Programs refers to programs for implementing various flowcharts (described below) according to the present exemplary embodiment. In this case, constants and variables for operations of the system control unit 50 and programs read from the nonvolatile memory 121 are loaded into the system memory 122.

Figure 2:
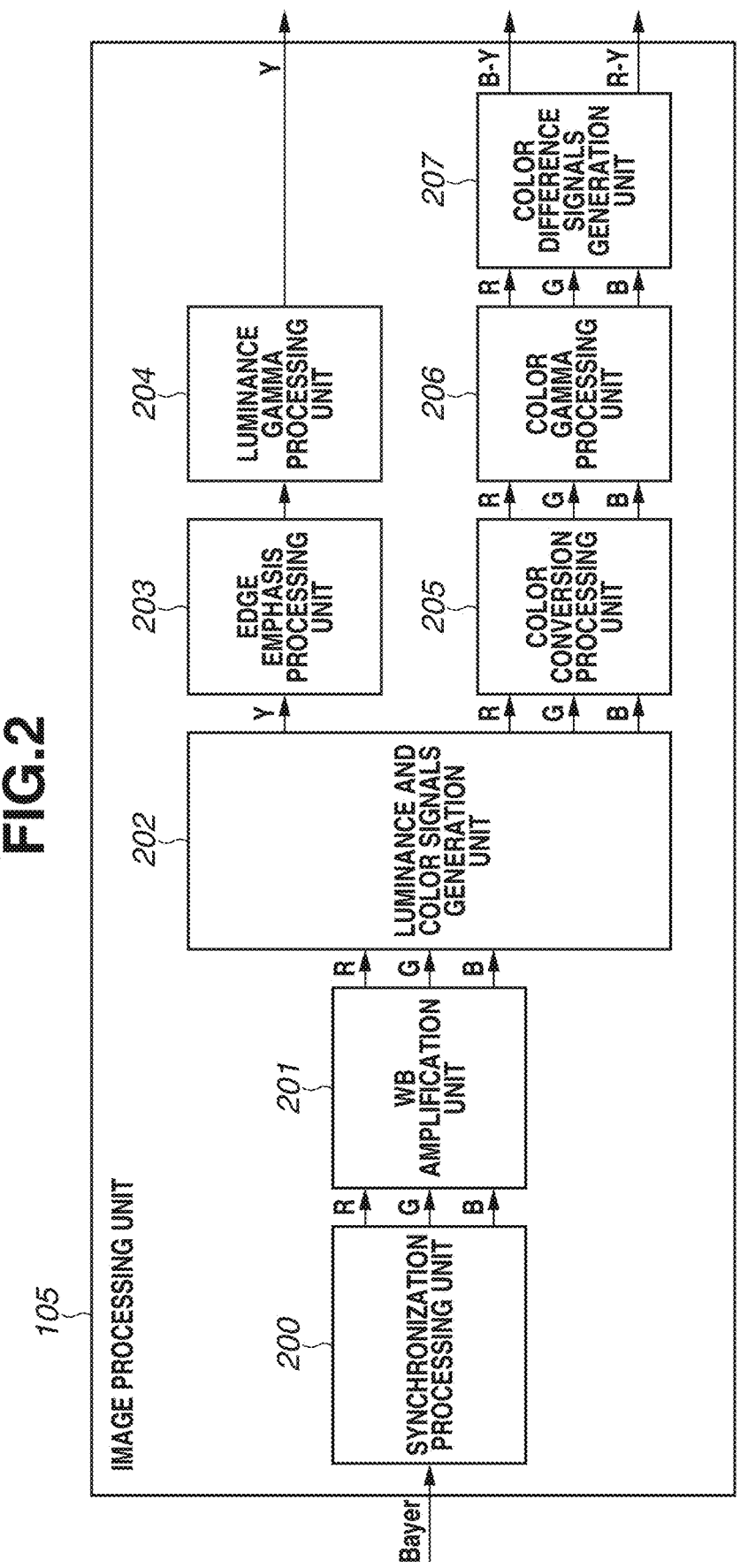
FIG. 2 is a block diagram illustrating a configuration of an image processing unit according to some embodiments.

The image processing unit 105 will be described in detail below with reference to FIG. 2. FIG. 2 is a block diagram illustrating a configuration of the image processing unit 105. Various forms of specific configurations can be assumed to implement the configurations illustrated in FIGS. 2 and 3. For example, a single hardware component may be provided for each portion illustrated in FIGS. 2 and 3, or a single hardware component may function as a plurality of portions. A plurality of hardware components including hardware components other than the image processing unit 105 may collaborate to function as any one of portions illustrated in FIGS. 2 and 3.

Referring to FIG. 2, the image processing unit 105 includes a synchronization processing unit 200, a white balance (WB) amplification unit 201, a luminance and color signals generation unit 202, an edge emphasis processing unit 203, a luminance gamma processing unit 204, a color conversion processing unit 205, a color gamma processing unit 206, and a color difference signals generation unit 207.

Processing of the image processing unit 105 will be described below. The image signal output from the A/D converter 104 illustrated in FIG. 1 is input to the image processing unit 105.

When the image signal input to the image processing unit 105, the image signal is input to the synchronization processing unit 200. The synchronization processing unit 200 performs synchronization processing on the input Bayer red, green, and blue (RGB) image data to generate R, G, and B (RGB) color signals, respectively. The WB amplification unit 201 multiplies the RGB color signals by a white balance gain value calculated by the system control unit 50 to adjust the white balance. The RGB color signals output by the WB amplification unit 201 are input to the luminance and color signals generation unit 202. The luminance and color signals generation unit 202 generates a Y luminance signal based on the RGB signals, outputs the generated Y luminance signal to the edge emphasis processing unit 203, and outputs the RGB color signals to the color conversion processing unit 205.

The edge emphasis processing unit 203 performs the edge emphasis processing on the Y luminance signal and outputs the resultant Y luminance signal to the luminance gamma processing unit 204. The luminance gamma processing unit 204 performs the gamma correction on the Y luminance signal and outputs the resultant Y luminance signal to the image memory 106.

The color conversion processing unit 205 performs a matrix operation on the RGB signals to convert the RGB signals into a desired color balance. The color gamma processing unit 206 performs gamma correction on the RGB color signals. The color difference signals generation unit 207 generates R-Y and B-Y color difference signals based on the RGB signals.

The codec unit 110 performs compression coding on the Y image signal and the R-Y and B-Y color difference signals output to the image memory 106 and records these signals in the recording medium 112.

A configuration and operations of the relighting process unit 114 will be described below with reference to FIG. 3. The relighting process according to the present exemplary embodiment refers to processing for adding to a captured image an effect of being illuminated by a virtual light source. The relighting process according to the present exemplary embodiment is performed at the time of image capturing, for example, if the user sets whether to perform the relighting process through a user operation before image capturing. Of course, the user may be asked to confirm whether to perform the relighting process at each image capturing, or the user may perform the relighting process on a captured and recorded image at any desired timing.

When the user sets to perform the relighting process through a user operation, the data output from the image processing unit 105 is input to the relighting process unit 114, which performs the relighting process by using a virtual light source. A plurality of modes may be selected even in the relighting process. According to the present exemplary embodiment, "Entire Lighting Mode", "Small Face Lighting Mode", and "Catch Light Mode" can be selected. These modes will be described below.

Figure 3:
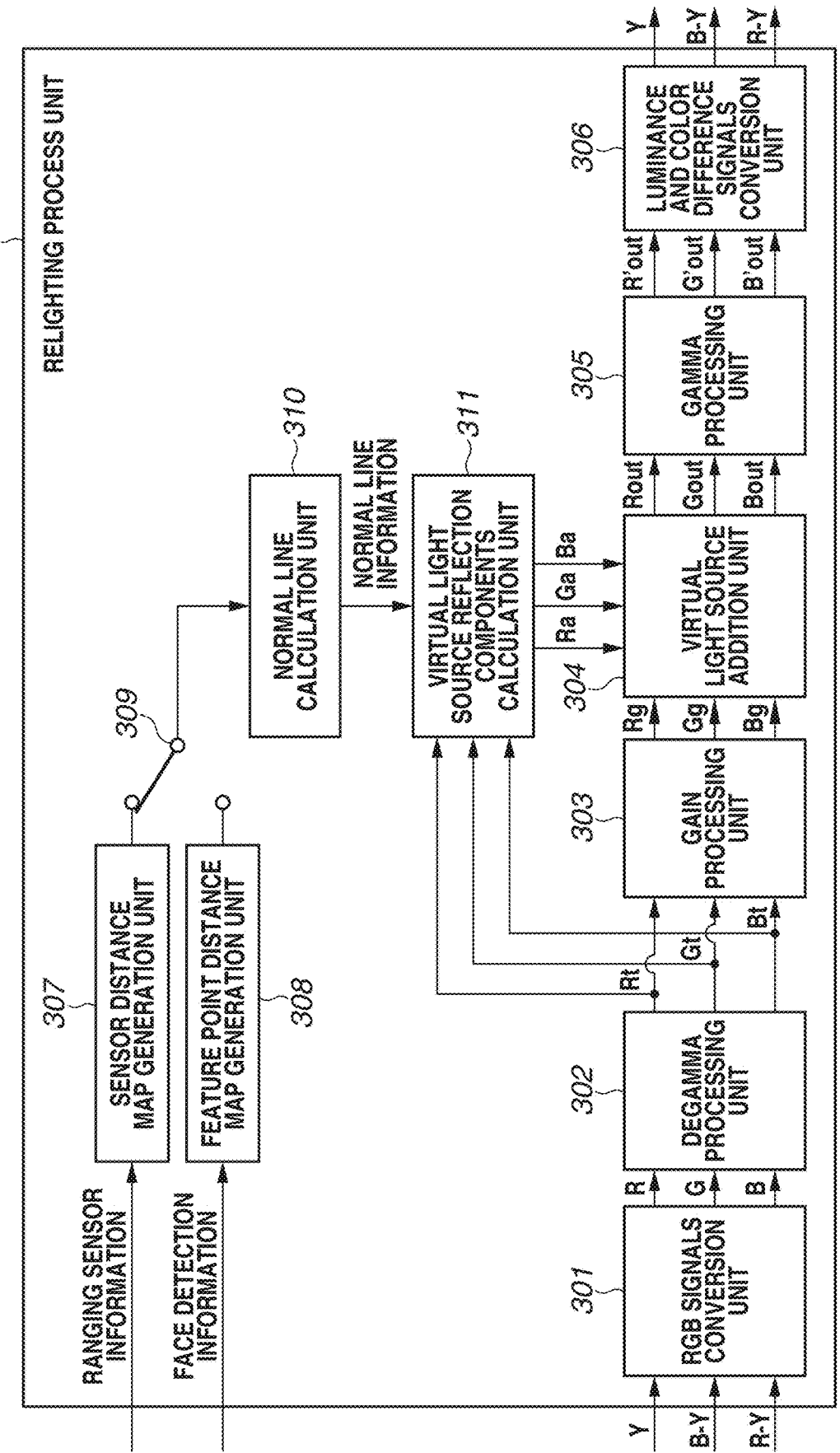
FIG. 3 is a block diagram illustrating a configuration of a relighting process unit according to some embodiments.

FIG. 3 is a block diagram illustrating a configuration of the relighting process unit 114.

Referring to FIG. 3, the relighting process unit 114 includes an RGB signals conversion unit 301 for converting the input luminance and color difference signals (Y, B-Y, R-Y) into the RGB signals and includes a degamma processing unit 302 for performing degamma processing. The relighting process unit 114 further includes a gain processing unit 303 for multiplying the input image by the gain and includes a virtual light source addition unit 304 for adding relighting signals by a virtual light source. The relighting process unit 114 further includes a gamma processing unit 305 for applying the gamma characteristics to the RGB signals and includes a luminance and color difference signals conversion unit 306 for converting the RGB signals into the luminance and color difference signals (Y, B-Y, R-Y).

The relighting process unit 114 further includes a sensor distance map generation unit 307 for generating a distance map based on subject distance information output from the above-described ranging sensor 124 and includes a feature point distance map generation unit 308 for generating a distance map based on feature points, for example, face coordinates of the subject. The digital camera 100 according to the present exemplary embodiment can generate two different maps indicating subject information in this way. Either one of the two different maps to be used can be selected by a switch 309. The switch 309 may be a physical switch, an electrical switch, or a logical switch with which a flag is internally changed by a program. The relighting process unit 114 further includes a normal line calculation unit 310 for calculating a normal (to the subject plane) based on a distance map and includes a virtual light source reflection components calculation unit 311 for calculating components of light of the virtual light source reflected by the subject.

Operations of the relighting process unit 114 configured as described above will be described below.

The relighting process unit 114 reads and inputs the luminance and color difference signals (Y, B-Y, R-Y) recorded in the image memory 106.

The RGB signals conversion unit 301 converts the input luminance and color difference signals (Y, B-Y, R-Y) into RGB signals and outputs the RGB signals to the degamma processing unit 302.

The degamma processing unit 302 calculates the inverse characteristics of the gamma characteristics applied by the luminance gamma processing unit 204 and the color gamma processing unit 206 of the image processing unit 105 to convert the RGB signals into linear data. The degamma processing unit 302 outputs the RGB signals (Rt, Gt, Bt) having undergone linear conversion to the virtual light source reflection components calculation unit 311 and the gain processing unit 303.

Figure 4A:
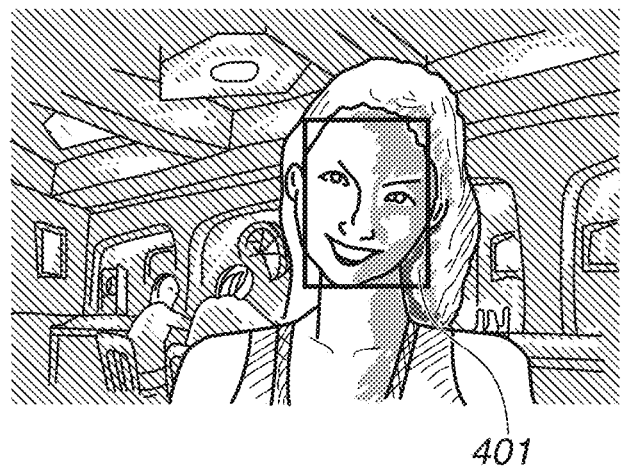
FIGS. 4A, 4B, and 4C illustrate examples of distance maps according to some embodiments.
Figure 4B:
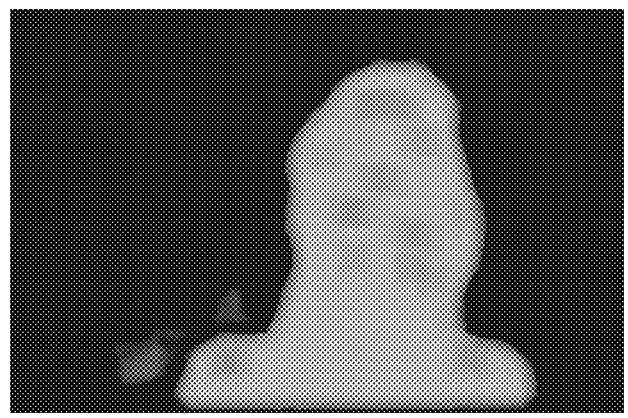
Figure 4C:
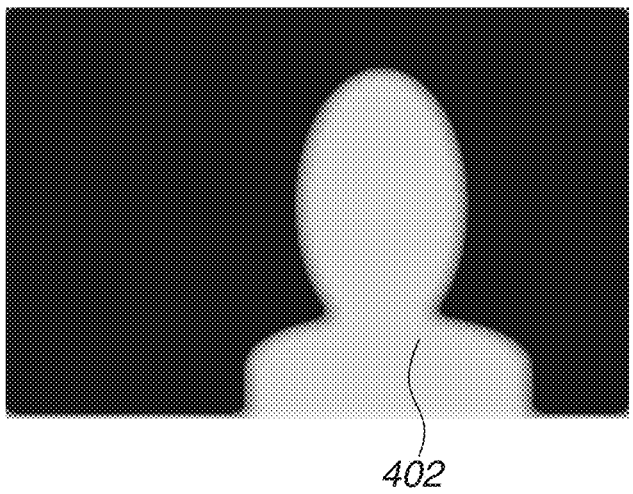

Map generation by the sensor distance map generation unit 307 will be described below. The sensor distance map generation unit 307 removes noise from the subject distance information output from the ranging sensor 124 (see FIG. 1) and generates a sensor distance map. Examples of sensor distance maps are illustrated in FIGS. 4A to 4C. FIGS. 4A to 4C illustrate examples of distance maps. Referring to FIGS. 4A to 4C, FIG. 4A illustrates a captured image. FIG. 4B illustrates an example of a sensor distance map generated by the sensor distance map generation unit 307. Referring to the distance map, higher luminance (near white in FIG. 4B) corresponds to subject areas closer to the camera side. The distance map indicates the spatial position (the coordinate position when xy coordinates are placed in the imaging plane, and the distance from the imaging plane to the subject) in the subject image and the subject shape.

In addition to the generation of a sensor distance map, the sensor distance map generation unit 307 calculates the reliability of the sensor distance map. This reliability is a value indicating the probability of the sensor distance map. The reliability can be totally calculated by using a known method, for example, based on the noise amount of the generated distance map, the number of spots included in the map, and the size of the map. A spot refers to an area where the parallax amount was not acquired, and is likely to occur when a flat subject is captured. Noise is likely to occur when the subject includes similar image patterns.

The map generation by the feature point distance map generation unit 308 will be described below. The feature point distance map generation unit 308 generates a feature point distance map based on the positions of the face, eyes, and mouth detected by the face detection unit 113. More specifically, the feature point distance map generation unit 308 performs face detection and estimates the subject size based on the positional relations between the eyes and the mouth of the subject. Then, the feature point distance map generation unit 308 enlarges or reduces a silhouette image of a prestored typical human body model according to the subject size and then positions the image to generate a feature point distance map. An example of a feature point distance map is illustrated in FIG. 4C. FIG. 4C illustrates a silhouette 402 of which the size and position are adjusted to a face position 401 of the subject. Although the shape of the silhouette 402 is different in detail from the original shape of the subject, the silhouette 402 is roughly similar in shape to the silhouette 401. The silhouette 402 has a feature that neither noise nor spots are present. According to the present exemplary embodiment, the distance of the silhouette portion is set to the foremost plane, and the distances of other portions are set to the rearmost plane. A feature point distance map may be generated by changing the shape of a prestored distance map of a typical face model according to the subject size. Examples of applicable face model distance maps include a map where the nose portion is the nearest and the distance gradually increases with increasing horizontal distance from the nose.

As described above, a sensor distance map provides high accuracy of distance but is likely to be affected by spots and noise. On the other hand, a feature point distance map does not provide high accuracy of distance but is less likely to be affected by spots and noise. For example, a sensor distance map is generated by calculating a correlation of a parallax image, as described above, and therefore generally requires a high calculation cost. On the other hand, a feature point distance map adopts a prestored model and therefore generally requires a lower calculation cost than a sensor distance map. As described above, the two different maps have different features.

The switch 309 switches the map to be used between a sensor distance map and a feature point distance map. A processing flow for determining switching will be described below.

Figure 5:
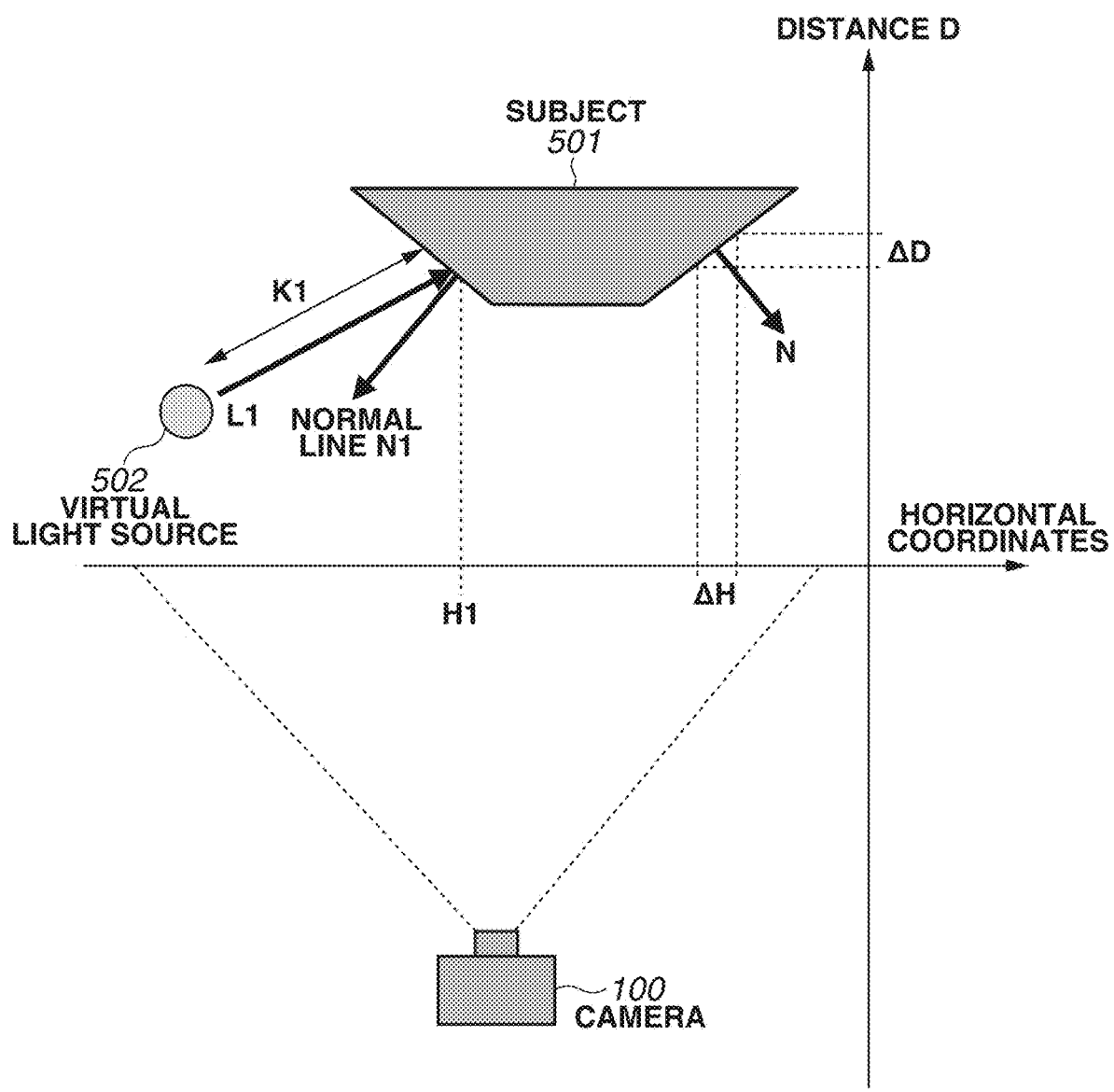
FIG. 5 illustrates reflection components in relighting according to some embodiments.

The normal line calculation unit 310 calculates a normal map based on a distance map. A known technique is used as a method for generating a normal map based on a distance map. An example of a method will be described below with reference to FIG. 5. FIG. 5 illustrates a relation between the camera imaging coordinates and a subject. For example, for a certain subject 501 illustrated in FIG. 5, by calculating slope information based on the ratio of a difference ΔD in a distance (depth) D to a difference ΔH in the horizontal direction of a captured image, a normal N can be calculated based on the slope information. Performing the above-described processing to each captured pixel enables calculating normal information N corresponding to each pixel of the captured image. The normal line calculation unit 310 outputs the normal information corresponding to each pixel of the captured image as a normal map to the virtual light source reflection components calculation unit 311.

The virtual light source reflection components calculation unit 311 calculates components of light of the installed virtual light source reflected by the subject, based on a distance K between the light source and the subject, the normal information N, and virtual light source parameters (determined in a processing flow to be described below).

More specifically, the virtual light source reflection components calculation unit 311 calculates reflection components at the coordinate position corresponding to the captured image so that the reflection components are inversely proportional to the square of the distance K between the light source and the subject and are proportional to the inner product of a normal vector N of the subject and a direction vector L of the light source.

This calculation will be described below with reference to FIG. 5. FIG. 5 illustrates the subject 501 and a position 502 of a set virtual light source. The reflection components at a horizontal pixel position H1 (descriptions of a vertical pixel position will be omitted to simplify descriptions) of the captured image captured by the camera 100 are proportional to the inner product of a normal N1 of the subject and a direction vector L1 of the virtual light source at the camera coordinates H1, and is inversely proportional to a distance K1 between the virtual light source and the subject positions.

When this relation is represented by a numerical expression, reflection components (Ra, Ga, Ba) of the subject by the virtual light source are obtained as follows:

$Ra=\alpha*(-L\cdot N)/K^2*Rw*Rt,$ $Ga=\alpha*(-L\cdot N)/K^2*1*Gt,$ and $Ba=\alpha*(-L\cdot N)/K^2*Bw*Bt.$ α denotes the intensity of the virtual light source, L denotes the three-dimensional direction vector of the virtual light source, and N denotes the three-dimensional normal vector of the subject, and R denotes the distance between the virtual light source and the subject. Rt, Gt, and Bt are imaging RGB data output from the degamma processing unit 302. Rw and Bw are parameters for controlling the color of the virtual light source. The reflection components (Ra, Ga, Ba) by the virtual light source calculated as described above are output to the virtual light source addition unit 304.

On the other hand, as represented by the following formulas, the gain processing unit 303 multiplies the input linear signals (Rt, Gt, Bt) by the gain 1/S:

$Rg=Rt/S,$ $Gg=Gt/S,$ and $Bg=Bt/S.$

S is larger than 1 (S>1), and 1/S denotes the gain for reducing the brightness of the input signals.

The virtual light source addition unit 304 performs the following processing for adding the virtual light source components (Ra, Ga, Ba) to the subject area:

$Rout=Rg+Ra,$ $Gout=Gg+Ga,$ and $Bout=Bg+Ba.$

Image signals (Rout, Gout, Bout) output from the virtual light source addition unit 304 are input to the gamma processing unit 305. The gamma processing unit 305 performs gamma correction on the RGB input signals. The luminance and color difference signals conversion unit 306 generates the Y luminance signal and the R-Y and B-Y color difference signals based on the RGB signals.

This completes the description of operations of the relighting process unit 114.

The system control unit 50 controls the memory control unit 107 to accumulate the luminance and color difference signals output by the relighting compensation unit 114 in the image memory 106, controls the codec unit 110 to perform compression coding, and records the signals in the recording medium 112 via the recording I/F 111.

A processing flow for controlling the distance map generation performed by the system control unit 50 will be described below.

Prior to the relighting process, the system control unit 50 receives a user operation on the operation unit 120 and sets the relighting mode. As described above, the digital camera 100 according to the present exemplary embodiment has the entire lighting mode, the small face lighting mode, and the catch light mode. The user selects any one of the above-described three relighting modes through a menu operation on the operation unit 120. These modes require different parameters in the relighting process. More specifically, the highlight and shade conditions generated on the subject by relighting are determined according to the selected relighting mode. This means that at least a part of the relighting parameters is also set for the relighting mode selection.

FIGS. 6A, 6B, and 6C illustrate examples of highlight and shade conditions generated in the three relighting modes.

FIG. 6A illustrates an example of relighting in the entire relighting mode. The entire relighting mode adds an effect that the subject is entirely illuminated with virtual light. Therefore, relighting is made not only on a specific subject but also on the background.

FIG. 6B illustrates an example of relighting in the small face lighting mode. The small face lighting mode adds an effect of a small face by illuminating the subject with light from above to apply slightly strong shading to the face line.

FIG. 6C illustrates an example of relighting in the catch light mode. The catch light mode applies catch light in the iris of the eyes by illuminating the subject with virtual light centering on the subject's face (especially eyes).

These relighting modes are roughly classified into an entire lighting mode for adding an effect that the subject is entirely illuminated with virtual light and a partial lighting mode (small face lighting mode and catch light mode) for adding an effect that the subject is partially illuminated with light.

When any one relighting mode is set, the system control unit 50 determines the relighting parameters to implement virtual lighting according to the set relighting mode. In the entire lighting mode, the subject is entirely illuminated with light having the characteristics centering on diffuse reflection.

In the small face lighting mode, the subject is partially illuminated with spot-like light centering on the face from obliquely above while slightly reducing the gain of the captured image by the gain processing unit 303 illustrated in FIG. 3. Thus, the face line becomes slightly dark while the center of the face becomes light, characteristically giving an impression of a small face.

In the catch light mode, the subject is illuminated with spot-like light centering on the eyes from obliquely below while performing control to increase the gain of the specular reflection components. This generates catch light in the eye area.

A control flow for generating a distance map by the system control unit 50 will be described below with reference to the flowchart illustrated in FIG. 7.

Figure 7:
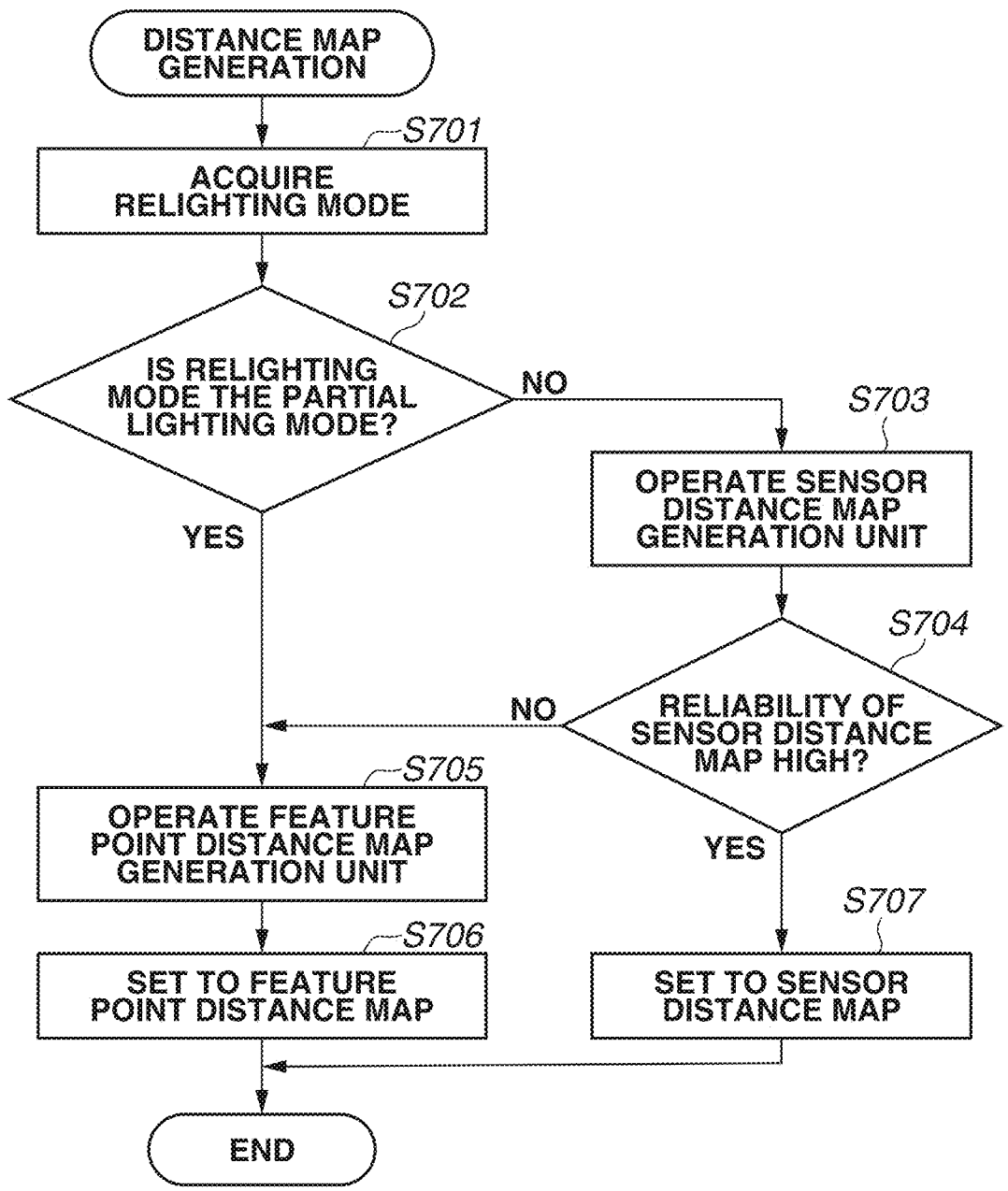
FIG. 7 is a flowchart illustrating processing for generating a distance map according to a first exemplary embodiment.

Referring to FIG. 7, in step S701, the system control unit 50 reads information about the relighting mode set as described above.

In step S702, the system control unit 50 determines whether the read relighting mode is the entire lighting mode in which the subject is entirely illuminated or the partial lighting mode in which the subject is partially illuminated. When the read relighting mode is the partial lighting mode (YES in step S702), the processing proceeds to step S705. On the other hand, when the read relighting mode is the entire lighting mode (NO in step S702), the processing proceeds to step S703.

In step S703, the system control unit 50 performs control to operate the sensor distance map generation unit 307 (illustrated in FIG. 3).

In step S704, the system control unit 50 acquires the reliability of a sensor distance map output by the sensor distance map generation unit 307 and determines whether the reliability of the sensor distance map is higher than a predetermined threshold value. As described above, the sensor distance map generation unit 307 outputs the reliability of the sensor distance map together with the sensor distance map. For example, when the reliability of the sensor distance map is reduced by such a factor as much noise (NO in step S704), the processing proceeds to step S705. On the other hand, when the reliability is higher than the threshold value (YES in step S704), the processing proceeds to step S707.

In step S705, the system control unit 50 performs control to operate the feature point distance map generation unit 308 (illustrated in FIG. 3).

In step S706, the system control unit 50 changes the switch 309 (illustrated in FIG. 3) to set the use of a feature point distance map.

In step S707, the system control unit 50 changes the switch 309 (illustrated in FIG. 3) to set the use of a sensor distance map.

This completes the description of a control flow for generating a distance map by the system control unit 50.

As described above, the digital camera 100 according to the present exemplary embodiment is configured to generate two different distance maps having different generation parameters and switch the generation method based on the relighting mode. This makes it possible to reduce errors, generate distance information with a low calculation cost, and acquire a desired lighting effect by using a virtual light source.

According to the present exemplary embodiment, in particular, the entire lighting mode preferentially uses a sensor distance map. This is because, in the entire lighting mode, using distance information about the entire image (positional relations between subjects in an image in the depth direction) enables more suitable relighting since an effect of virtual light is added not only to the main subject but also to the background. On the other hand, the partial lighting mode preferentially uses a feature point distance map. This is because, in the partial lighting mode, for example, an effect of virtual light needs to be added only to the main subject.

Other Embodiments

Although the digital camera 100 according to the above-described exemplary embodiment is configured to switch a distance map to be generated between the mode in which the subject is partially illuminated with virtual light and the mode in which the subject is entirely illuminated with virtual light, the exemplary embodiment is not limited thereto as long as a distance map is changed based on the parameters of a virtual light source. Examples of the parameters of a virtual light source include the distance from the subject to the virtual light source, and the direction, illumination angle, and intensity of the virtual light source. The system control unit 50 identifies an illumination range based on these parameters. The system control unit 50 may perform control to select a feature point distance map if the illumination range is local to the subject or to select a sensor distance map if the illumination range covers the entire subject.

Although, in the above-described exemplary embodiment, two different distance maps (a sensor distance map and a feature point distance map) are generated, the method for generating a distance map is not limited thereto. Any configuration is applicable as long as a distance map to be adopted is switched based on the relighting parameters. For example, the digital camera 100 according to the present exemplary embodiment may be configured to generate a parallax distance map by using the parallax of a multi-viewpoint image, instead of a sensor distance map, and switch a distance map to be generated between a parallax distance map and a feature point distance map.

Although, in the above-described exemplary embodiment, there are three different relighting modes ("Entire Lighting Mode", "Small Face Lighting Mode", and "Catch Light Mode"), the relighting modes are not limited thereto. Any relighting mode is applicable as long as a distance map to be generated is switched according to the current relighting mode.

Although, in the above-described exemplary embodiment, the relighting modes are modes for determining the illumination characteristics of a virtual light source, the relighting modes may be modes for determining the timing when relighting is performed. For example, the relighting modes may include a first mode and a second mode. In the first mode, the relighting process is automatically performed immediately after image capturing. In the second mode, a captured image recorded in a recording medium, such as a memory card, is read after image capturing, and the relighting process is performed based on a user operation. In this case, the digital camera 100 may uses feature point distance map in the first mode and use a sensor distance map in the second mode. The reason is as follows. In the first mode, immediately after capturing an image, the image having undergone the relighting process needs to be displayed. It may therefore be desirable to use a feature point distance map requiring a low calculation cost. In the second mode, on the other hand, the user has sufficient time to adjust a relighting effect. It may therefore be desirable to use a sensor distance map so that a relighting effect can be finely adjusted. Spots and noise may exist in a sensor distance map. Therefore, even in the second mode, a feature point distance map may be used if the reliability of a sensor distance map is lower than a predetermined value. Alternatively, information about a sensor distance map (for example, spots and noise area) may be interpolated by information about a feature point distance map. The reliability of a sensor distance map can be evaluated based on the size of spots and the magnitude of noise.

In the above-described first mode, a distance map may be selected based on the parameters of a virtual light source according to the above-described exemplary embodiment before the relighting process. In the second mode, a sensor distance map may be used. If the captured image and parallax information are recorded together, the digital camera 100 can generate a feature point distance map even after image capturing. Therefore, the information about a distance map will not be lacking when performing the relighting process afterward.

Although the digital camera 100 according to the above-described exemplary embodiment is configured to switch a method for generating a distance map, the digital camera 100 can be configured not only to switch the method but also to combine distance maps generated by a plurality of methods. In this case, the combination ratio according to the priority of each distance map may be determined by the relighting mode parameters.

Regardless of whether the digital camera 100 switches a distance map or combines distance maps, the digital camera 100 will determine which distance map generated by either method is to be given priority.

Although the relighting process according to the above-described exemplary embodiment adds an effect of lighting an image, an effect of darkening an image may be added. For example, in the relighting process, a negative gain may be applied to reduce the luminance of excessively lit portions (for example, facial shine) in the subject area.

Some embodiments do not need to be embodied with the digital camera 100. For example, an image captured by the digital camera 100 may be transmitted to an external apparatus having image processing functions, such as a personal computer, a smart phone, and a tablet, and the external apparatus may perform the relighting process. It is assumed that the processing for generating a distance map in this case can be suitably shared by the digital camera 100 and an external apparatus.

Some embodiments are also implemented by performing the following processing. More specifically, software (program) for implementing the functions of the above-described exemplary embodiment is supplied to a system or apparatus via a network or various types of storage media, and a computer (or CPU or micro processing unit (MPU)) of the system or apparatus reads and executes the program.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2018-069289, which was filed on Mar. 30, 2018 and which is hereby incorporated by reference herein in its entirety.

What is claimed is:

1. An image processing apparatus for performing a relighting process for adding an effect of virtual light to an image, the image processing apparatus comprising:
 at least one processor configured to function as the following units:
 a plurality of acquisition units configured to acquire distance distribution information about a subject included in the image,
 wherein the plurality of acquisition units comprise:
  a first acquisition unit configured to acquire the distance distribution information about the subject included in the image, based on parallax information about the image, and
  a second acquisition unit configured to acquire the distance distribution information about the subject included in the image, based on a feature quantity of the image different from the parallax information;
 a setting unit configured to set a mode of the relighting process for adding the effect of virtual light to the image, wherein the mode includes a first mode for automatically performing the relighting process on the image after capturing the image, and a second mode for performing, based on a user operation, the relighting process on the image after the image is recorded in a recording medium; and
 a determination unit configured to determine an acquisition unit, among the plurality of acquisition units, to preferentially use the distance distribution information with which the relighting process is to be performed, based on the mode set by the setting unit;

wherein, in the first mode, the determination unit preferentially uses the distance distribution information acquired by the second acquisition unit rather than the distance distribution information acquired by the first acquisition unit, and, in the second mode, the determination unit preferentially uses the distance distribution information acquired by the first acquisition unit rather than the distance distribution information acquired by the second acquisition unit.

2. The image processing apparatus according to claim 1, further comprising a third acquisition unit configured to acquire a reliability of the distance distribution information acquired by the first acquisition unit, wherein, in a case where the reliability acquired by the third acquisition unit is lower than a predetermined value in the second mode, the determination unit uses the distance distribution information acquired by the second acquisition unit.

3. The image processing apparatus according to claim 1, wherein the second acquisition unit acquires the distance distribution information about the subject included in the image, based on a feature quantity of a face area in the image.

4. The image processing apparatus according to claim 1, wherein the second acquisition unit acquires the distance distribution information only for a face area in the image.

5. The image processing apparatus according to claim 1, the at least one processor configured to further function as the following unit:
   a combining unit configured to combine the distance distribution information acquired by the first acquisition unit and the distance distribution information acquired by the second acquisition unit;
   wherein determination by the determination unit includes determining priority between the distance distribution information acquired by the first acquisition unit and the distance distribution information acquired by the second acquisition unit, and
   wherein, based on the priority, the combining unit combines the distance distribution information acquired by the first acquisition unit and the distance distribution information acquired by the second acquisition unit.

6. An image processing apparatus for performing a relighting process for adding an effect of virtual light to an image, the image processing apparatus comprising:
   at least one processor configured to function as the following units:
   a plurality of acquisition units configured to acquire distance distribution information about a subject included in the image,
   wherein the plurality of acquisition units comprise:
      a first acquisition unit configured to acquire the distance distribution information about the subject included in the image, based on parallax information about the image, and
      a second acquisition unit configured to acquire the distance distribution information about the subject included in the image, based on a feature quantity of the image different from the parallax information;
   a setting unit configured to set a mode of the relighting process, wherein the mode includes a third mode for performing the relighting process on the entire image, and a fourth mode for performing the relighting process on a specific area of the image and not performing the relighting process on the entire image; and
   a determination unit configured to determine an acquisition unit, among the plurality of acquisition units, to preferentially use the distance distribution information with which the relighting process is to be performed, based on the mode set by the setting unit,
   wherein, in the third mode, the determination unit preferentially uses the distance distribution information acquired by the first acquisition unit rather than the distance distribution information acquired by the second acquisition unit, and, in the fourth mode, the determination unit preferentially uses the distance distribution information acquired by the second acquisition unit rather than the distance distribution information acquired by the first acquisition unit.

7. An image processing apparatus for performing a relighting process for adding an effect of virtual light to an image, the image processing apparatus comprising:
   at least one processor configured to function as the following units:
   a plurality of acquisition units configured to acquire distance distribution information about a subject included in the image,
   wherein the plurality of acquisition units comprise:
      a first acquisition unit configured to acquire the distance distribution information about the subject included in the image, based on parallax information about the image, and
      a second acquisition unit configured to acquire the distance distribution information about the subject included in the image, based on a feature quantity of the image different from the parallax information;
   a setting unit configured to set a mode of the relighting process for adding the effect of virtual light to the image,
   wherein, the mode includes a fifth mode for performing the relighting process on a specific subject area and a background area of the specific subject, and a sixth mode for performing the relighting process on the specific subject area and not performing the relighting process on the background area of the specific subject; and
   a determination unit configured to determine an acquisition unit, among the plurality of acquisition units, to preferentially use the distance distribution information with which the relighting process is to be performed, based on the mode set by the setting unit,
   wherein, in the fifth mode, the determination unit preferentially uses the distance distribution information acquired by the first acquisition unit rather than the distance distribution information acquired by the second acquisition unit, and, in the sixth mode, the determination unit preferentially uses the distance distribution information acquired by the second acquisition unit rather than the distance distribution information acquired by the first acquisition unit.

8. A method for controlling an image processing apparatus for performing a relighting process for adding an effect of virtual light to an image, the method comprising:
   acquiring distance distribution information about a subject included in the image by using at least one of a plurality of acquisition methods,
   wherein the plurality of acquisition methods comprise:
      a first acquisition method configured to acquire the distance distribution information about the subject included in the image, based on parallax information about the image, and a second acquisition method configured to acquire the distance distribution information about the subject included in the image, based on a feature quantity of the image different from the parallax information;

setting a mode of a relighting process for adding the effect of virtual light to the image, wherein the mode includes a first mode for automatically performing the relighting process on the image after capturing the image, and a second mode for performing, based on a user operation, the relighting process on the image after the image is recorded in a recording medium; and determining an acquisition method, among the plurality of acquisition methods, to preferentially use the distance distribution information with which the relighting process is to be performed based on the mode, wherein, in the first mode, the determining preferentially uses the distance distribution information acquired by the second acquisition method rather than the distance distribution information acquired by the first acquisition method, and, in the second mode, the determining preferentially uses the distance distribution information acquired by the first acquisition method rather than the distance distribution information acquired by the second acquisition method.

9. A non-transitory computer-readable storage medium storing a program for causing a computer to execute a method for controlling an image processing apparatus for performing a relighting process for adding an effect of virtual light to an image, the method comprising:

acquiring distance distribution information about a subject included in the image by using at least one of a plurality of acquisition methods, wherein the plurality of acquisition methods comprise:

a first acquisition method configured to acquire the distance distribution information about the subject included in the image, based on parallax information about the image, and a second acquisition method configured to acquire the distance distribution information about the subject included in the image, based on a feature quantity of the image different from the parallax information;

setting a mode of a relighting process for adding the effect of virtual light to the image, wherein the mode includes a first mode for automatically performing the relighting process on the image after capturing the image, and a second mode for performing, based on a user operation, the relighting process on the image after the image is recorded in a recording medium; and determining an acquisition method, among the plurality of acquisition methods, to preferentially use the distance distribution information with which the relighting process is to be performed based on the mode, wherein, in the first mode, the determining preferentially uses the distance distribution information acquired by the second acquisition method rather than the distance distribution information acquired by the first acquisition method, and, in the second mode, the determining preferentially uses the distance distribution information acquired by the first acquisition method rather than the distance distribution information acquired by the second acquisition method.

* * * * *